United States Patent
McIntyre

(10) Patent No.: US 6,490,421 B2
(45) Date of Patent: Dec. 3, 2002

(54) METHODS AND APPARATUS FOR CORRECTING ROTATIONAL SKEW IN DUPLEX IMAGES

(75) Inventor: C. Kevin McIntyre, Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/781,826

(22) Filed: Feb. 12, 2001

(65) Prior Publication Data

US 2002/0110380 A1 Aug. 15, 2002

(51) Int. Cl.⁷ .............................................. G03G 15/00
(52) U.S. Cl. ......................... 399/15; 399/395; 399/401
(58) Field of Search ........................... 399/15, 16, 395, 399/401; 358/1.18, 296, 401; 382/112, 294

(56) References Cited

U.S. PATENT DOCUMENTS

| | | |
|---|---|---|
| 4,728,963 A | 3/1988 | Rasmussen et al. |
| 4,987,448 A | 1/1991 | Chikama |
| 5,054,098 A | 10/1991 | Lee |
| 5,092,579 A | 3/1992 | Tokoro et al. |
| 5,152,622 A | 10/1992 | Rasmussen et al. |
| 5,196,897 A | 3/1993 | Trask |
| 5,226,741 A | 7/1993 | Kumazaki et al. |
| 5,239,313 A | 8/1993 | Marko et al. |
| 5,317,371 A | 5/1994 | Monma et al. |
| 5,392,092 A | 2/1995 | Laidlaw et al. |
| 5,427,462 A | 6/1995 | Jackson et al. |
| 5,506,918 A | 4/1996 | Ishitani |
| 5,524,994 A | 6/1996 | Hirano et al. |
| 5,588,761 A | 12/1996 | Seib |
| 5,666,208 A * | 9/1997 | Farrell et al. ............... 358/296 |
| 5,709,381 A | 1/1998 | Hourtash et al. |
| 5,758,251 A | 5/1998 | Takahashi et al. |
| 5,772,343 A | 6/1998 | Beretta et al. |
| 5,790,915 A | 8/1998 | Arcaro et al. |
| 5,819,153 A | 10/1998 | Lim |
| 5,836,706 A | 11/1998 | Ruhe |
| 5,956,055 A | 9/1999 | Gibson et al. |
| 6,008,826 A | 12/1999 | Foote et al. |
| 6,018,640 A | 1/2000 | Blackman et al. |
| 6,029,020 A | 2/2000 | Blackman et al. |
| 6,118,950 A | 9/2000 | Wibbels et al. |

* cited by examiner

Primary Examiner—Joan Pendegrass

(57) ABSTRACT

Methods and apparatus for reducing or eliminating rotational skew between images formed on opposing sides of a media sheet during duplex printing. An image forming device is configured to print out a test page having a skewing scale formed thereon. A rotational skew correction factor can be determined from the skewing scale and provided to the image forming device, which is configured to alter placement of images on a media sheet in response to the rotational skew correction factor to compensate for rotational skew.

22 Claims, 7 Drawing Sheets

METHODS AND APPARATUS FOR CORRECTING ROTATIONAL SKEW IN DUPLEX IMAGES

FIELD OF THE INVENTION

The present invention relates generally to image forming devices capable of forming text, graphics and/or other symbols on both sides of a media sheet. Specifically, the present invention relates to a method for adjusting the rotational skewing of text, graphics and/or other symbols to be formed on opposing sides of a media sheet relative to one another, as well as relative to the edges of the media sheet.

BACKGROUND OF THE INVENTION

Image forming devices, such as laser printers, inkjet printers, copiers, facsimile devices, and the like, adapted for forming text, graphics and/or other symbols—which will be referred to herein collectively as simply "images"—on a media sheet are well known in the art. These image forming devices typically apply ink or toner to the media sheet—for example, a pre-cut paper sheet—in a specified pattern to form the images thereon. Such devices may also be adapted to form images on both of the opposing sides of a media sheet, the process of forming images on opposing sides of a media sheet commonly being referred to as duplex printing. The advantages of duplex printing include reducing the quantity of paper required for a print set as compared to one-sided (simplex) printing, and generating print sets with layouts resembling that of professionally printed books.

Conventional image forming devices adapted for duplex printing, such as duplex printers, typically include a source device, such as a paper tray, and a feed mechanism or pick roller to draw an individual media sheet from the source device and to feed the media sheet to a print engine. The print engine is configured to receive the media sheet and to form images on one side thereof. To form images on the media sheet, the print engine includes a printing apparatus, wherein the printing apparatus may be of the ink jet type or the electrophotographic type (i.e., a laser printer), or any other suitable printing apparatus known in the art. Subsequently, the media sheet—having images formed on one side thereof—is transferred to a path selection gate. If simplex printing is desired, the path selection gate directs the media sheet to an output device, such as an output tray, where the media sheet is retained for pick-up by an operator. If duplex printing is desired, the path selection gate routes the media sheet to a duplexer. The duplexer is an apparatus configured to enable printing of a second, opposing side of the media sheet by the print engine.

In one type of duplexer known in the art, the path selection gate directs the media sheet to a secondary tray where the media sheet is temporarily held. Once all of the media sheets in a print set have received the appropriate images on a first side thereof, respectively, the media sheets are drawn out of the secondary tray and are fed back to the print engine for application of images to a second, opposing side thereof, respectively. In an alternative approach, the duplexer comprises a duplexing paper path configured to directly reverse and return a media sheet (having images applied to one side thereof) to the print engine for application of images to a second side thereof. Operation of the pick roller, print engine, path selection gate, and duplexer is typically controlled by a controller. The controller typically includes firmware, which stores data and routines that enable operation of the image forming device. Also, an image forming device usually includes a control panel for inputting data and/or commands into the controller.

As a media sheet travels through an image forming device, it may become misaligned relative to the print engine, resulting in application of images to the media sheet that are skewed relative to the media sheet, as well as resulting in images on one side of a media sheet that are skewed relative to images on a second, opposing side of the media sheet. Generally, there are two types of skewing, including translational skew and rotational skew. Translational skew occurs when images are offset horizontally and/or vertically from a desired location on a media sheet, and/or when images on one side of a media sheet are horizontally and/or vertically offset from images on a second, opposing side thereof. Rotational skew occurs when images are rotationally offset through an angle from a desired rotational orientation on a media sheet, and/or when images on one side of a media sheet are rotationally offset through an angle relative to the rotational orientation of images on a second, opposing side thereof.

Skew, whether translational or rotational, can result from any one of a number of circumstances, or a combination thereof. For example, a media sheet may be misaligned in the source device and this misalignment may not be corrected as the media sheet is drawn out of the source device. Misalignment in the source device may result from wear and tear of the source device and/or from a source device or component thereof that fails to meet design tolerance specifications. Misalignment may also be imparted to a media sheet as it travels from the source tray to the print engine and/or as it travels through a duplexer and back to the print engine. Typically, an image forming device includes a plurality of rollers and guides, as well as one or more actuators, configured to move media sheets through the image forming device and between the pick roller, print engine, path selection gate, and duplexer. Due to extended use, these mechanical parts may become worn or damaged and fail to operate effectively. Also, a roller, guide, actuator, or other mechanical part, may not function properly due to manufacturing defects and/or a failure to meet design tolerance specifications.

The condition of a media sheet itself may affect the manner in which an image forming device is able to manipulate that media sheet. For example, variation in media sheet dimensions may result in skewing, especially in duplex printing wherein both opposing edges of a media sheet may be used for alignment or registration. Variation in media sheet dimensions may be the inherent result of manufacturing processes or such variation may be introduced by a printing process. For instance, electrophotographic printing generally involves passing a media sheet through a heated fuser in order to create a permanent image. Passing the media sheet through a heated fuser may reduce the moisture content of the media sheet and thereby alter one or more of the dimensions of the media sheet during printing. Moreover, the moisture content of a media sheet before printing may affect manipulation of the media sheet by an image forming device. For example, a very high moisture content (i.e., as may be found in a humid climate) or a very low moisture content (i.e., as may be found in a dry climate) of a media sheet may impact the ability of that media sheet to be manipulated by an image forming device, thereby resulting in skew.

It is known in the art to perform duplex registration to compensate for translational skew. Duplex registration generally comprises adjusting the horizontal and/or vertical positions of images on one or both sides of a media sheet to align these images relative to one another in the horizontal and vertical directions. One method for performing duplex registration of an image forming device—such as described in U.S. Pat. No. 6,118,950 to Wibbels et al.—includes printing a test page having, on one side, a first set of horizontal and vertical demarcation elements (i.e., a first portion of a vernier scale) and, on an opposing side, a second set of horizontal and vertical demarcation elements (i.e., a second portion of a vernier scale). The test page can be held up to a light, enabling an operator to compare the second set of demarcation elements against the first set of demarcation elements and, thus, providing the operator with a means for determining horizontal and vertical correction values for images on one or both sides of a media sheet. These horizontal and vertical correction values are then input via a control panel to the image forming device's controller, which then directs the print engine to reposition the images on one or both sides of the media sheet in accordance with the respective correction values, such that the images on the opposing sides of a media sheet line up with one another, as well as with the edges of the media sheet, in the horizontal and vertical directions. However, the above-described duplex registration procedure ignores rotational skewing problems.

As printers are being designed to operate at ever-increasing speeds and greater duty cycles, problems such as misalignment and skew resulting from extended use and wear become even more significant. Thus, especially for duplex printing, the failure to compensate for rotational skewing may result in poor quality duplex images. Further, even though an image forming device may be outputting duplex images that meet performance specifications, it may still be desirable to compensate for rotational skewing, as well as for translational skewing, in order to meet user demands in certain high performance markets, such as book printing. Accordingly, a need exists in the art for methods and apparatus for compensating for rotational skew in duplex printing operations.

SUMMARY OF THE INVENTION

The present invention encompasses methods and apparatus for reducing or eliminating rotational skew between images formed on opposing sides of a media sheet. Image forming devices capable of duplex printing—i.e., capable of applying text, graphics, and/or other symbols on both of the opposing sides of a media sheet—are well known in the art. Such imaging devices typically comprise a print engine adapted to form images on a media sheet received from a source device, which may include one or more source trays or any other suitable media source. Conventional image forming devices further include a path selection gate configured, for simplex printing, to direct a media sheet having images on one side thereof to an output device and, for duplex printing, to direct a media sheet to a duplexer configured to enable printing of a second, opposing side of the media sheet by the print engine. Due to extended use and wear of the various mechanical and electromechanical components comprising such an image forming device, as well as a failure to adhere to design tolerances and the presence of manufacturing defects in these components, misalignment often occurs between a media sheet moving through an image forming device and the print engine, resulting in rotational skew between images formed on opposing sides of the media sheet.

Rotational skew, as noted above, is reduced or eliminated using a duplex test page having a skewing scale according to the invention. The skewing scale comprises a first portion formed on one side of the duplex test page and a second portion formed on a second, opposing side of the duplex test page. The first portion includes mutually orthogonal coordinate axes intersecting at an origin and a skew axis intersecting one of the coordinate axes and oriented perpendicular thereto. The skew axis includes a plurality of tick marks spaced along its length, each tick mark corresponding to a rotational skew correction factor, which may be printed next to its corresponding tick mark. The second portion of the skewing scale comprises a substantially straight line, or skew line, that intersects the origin of the first portion. This skew line is hypothetically parallel to one of the coordinate axes of the first portion (and perpendicular to the other of the coordinate axes).

The first portion of the skewing scale in cooperation with the second portion of the skewing scale provide a tool for compensating for rotational skew. If misalignment exists between the duplex test page and the print engine of an image forming device, the skew line will be rotationally skewed relative to the first portion of the skewing scale formed on the first side of the duplex test page. To compensate for this rotational skew, the first portion of the skewing scale is compared against the second portion, and a rotational skew correction factor is determined from this comparison. In particular, the skew line of the second portion is compared to the coordinate axes and skew axis of the first portion, and the tick mark most closely spaced to the point of intersection between the skew line and the skew axis corresponds to the required rotational skew correction factor, which may be directly read from the duplex test page. Comparison between the first and second portions of the skewing scale may be facilitated by holding the duplex test page up to a light source.

The rotational skew correction factor can then be provided to the image forming device, and a controller of the image forming device directs the print engine to alter placement of images on the first and/or second side of the media sheet based upon the rotational skew correction factor, thereby rotationally aligning images on opposing sides of a media sheet relative to one another. Altering placement of images on one or both sides of a media sheet may be achieved using coordinate transformation matrices. Rotational skew correction factors may also be provided to the image forming device to orient images formed on the opposing sides of a media sheet relative to the edges of the media sheet itself. In an alternative embodiment, a unique rotational skew correction factor is selected according to the invention for each source tray of an image forming device having two or more source trays.

The selection of a set of rotational skew correction factors is arbitrary, and the only requirement is that the image forming device be capable of interpreting a rotational skew correction factor and performing the necessary adjustments. Also, although the tick marks on the skew axis may be equidistantly spaced, in an alternative embodiment the distances between adjacent tick marks are not all the same. Further, the distance between two adjacent tick marks does not necessarily have to correspond to a physical parameter, such as a measured angle. In another alternative embodiment, however, the distances between adjacent tick marks correspond to a standard unit angle as measured about the origin of the coordinate axes.

Another embodiment of the invention comprises an image forming device, such as an ink jet printer, laser printer, photo copier, or facsimile, configured to generate and print a duplex test page, as described above. The image forming device is further configured to receive a rotational skew correction factor and to perform the appropriate corrective action in response to the rotational skew correction factor. The data, routines, and/or executable instructions enabling the printing of a duplex test page and enabling the image forming device to receive and respond to a rotational skew correction factor may be included in the firmware of a controller. Also, an image forming device may be configured to receive and store a unique rotational skew correction factor for each source tray of an image forming device having a source device including multiple source trays.

DESCRIPTION OF THE DRAWINGS

While the specification concludes with claims particularly pointing out and distinctly claiming that which is regarded as the present invention, the features and advantages of this invention can be more readily ascertained from the following detailed description of the invention when read in conjunction with the accompanying drawings, in which:

DETAILED DESCRIPTION OF THE INVENTION

Figure 1:
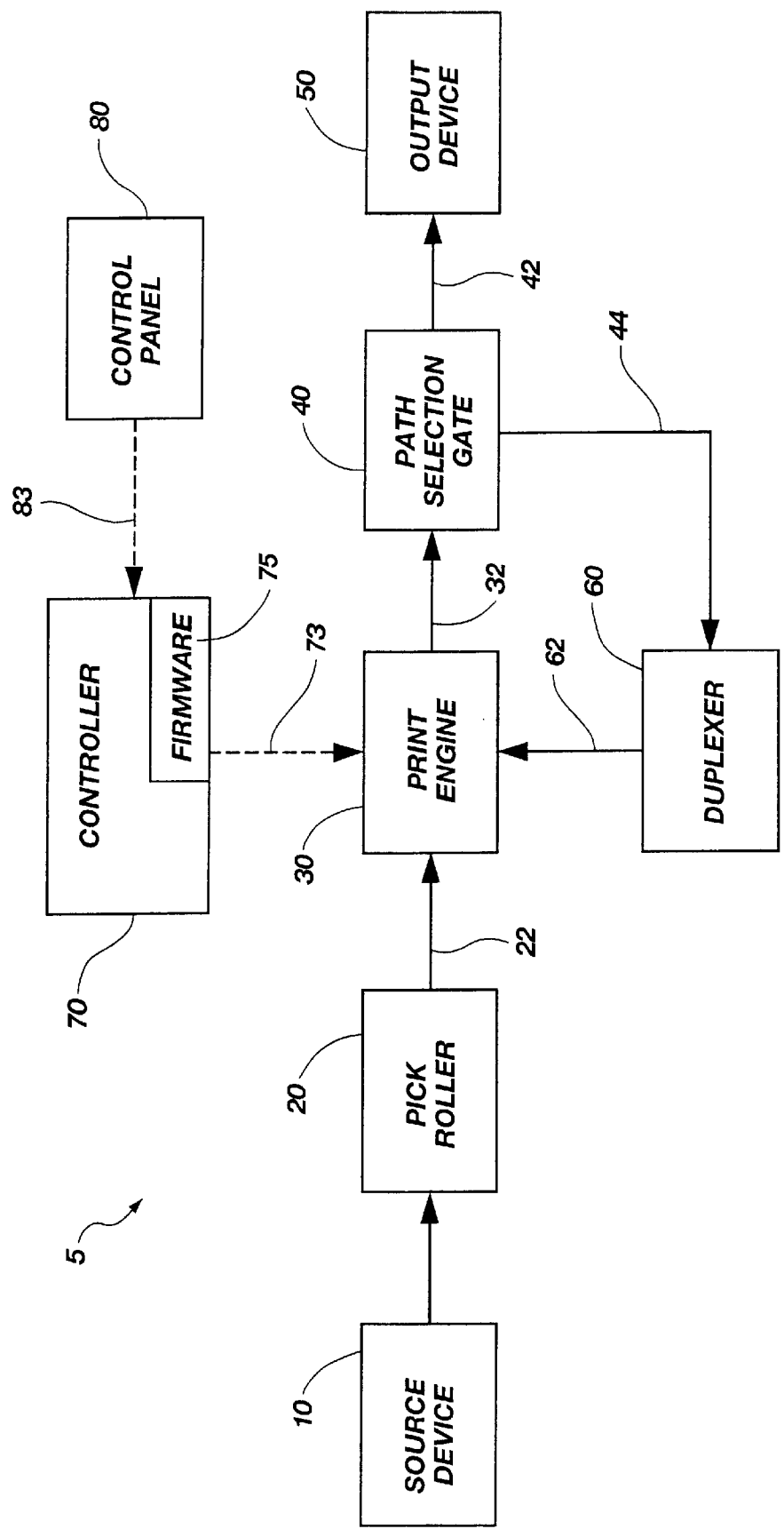
FIG. 1 is a schematic diagram of an exemplary embodiment of a conventional image forming device.

Shown in FIG. 1 is a schematic diagram of an exemplary embodiment of a conventional image forming device 5. The conventional image forming device 5 may comprise an ink jet printer, laser printer, photo copier, facsimile, or any other similar printing device known in the art. The image forming device 5 includes a source device 10, which may include, for example, one or more source trays, a multiple tray device, or any other suitable media source, for storing or providing a plurality of media sheets that are to receive images thereon. A pick roller 20 or other type of feed mechanism draws an individual media sheet from the source tray 10 and moves the media sheet along a path 22 to a print engine 30. The print engine 30, which may be of the ink jet type, electrophotographic type, or other suitable type of printing apparatus, is configured to form an image on one side of the media sheet. After receiving an image on one side, the media sheet is transferred along a path 32 to a path selection gate 40. If images are to be printed on only one side of the media sheet (i.e., simplex printing), the path selection gate 40 directs the media sheet along a path 42 to an output device 50, which may include, for example, one or more output trays or any other suitable media processing device, such as, for example, a Hewlett-Packard LaserJet Print to Mail Accessory. If images are to be printed on a second, opposing side of the media sheet, the path selection gate 40 directs the media sheet along a path 44 to a duplexer 60.

The duplexer 60 is configured such that the second side of the media sheet may be presented to the print engine 30 to have images formed thereon. The duplexer 60 may comprise a paper path adapted to receive the media sheet immediately after images are formed on the first side thereof and transfer the media sheet along a path 62 directly back to the print engine 30 for application of images to the opposing side thereof. Alternatively, the duplexer 60 may comprise a secondary tray (not shown) adapted to receive all of the media sheets in a print set having images applied to a first side thereof, respectively. In such an embodiment, once all of the media sheets in the print set have been received in the secondary tray, the media sheets are fed one-by-one along the path 62 to the print engine 30 for application of images to an opposing side thereof, respectively.

After application of images to the second side of the media sheet, the media sheet is transferred from the print engine 30 back to the path selection gate 40, which then directs the media sheet along the path 42 to the output device 50. The duplex printing cycle is then complete, and the above-described process may be repeated for additional media sheets, as desired. During the print cycle—whether duplex or simplex—operation of the print engine 30 is controlled by a controller 70, which is coupled to the print engine 30 by one or more conductors 73. The controller may also be electrically coupled to other components of the image forming device 5, such as the pick roller 20, path selection gate 40, and duplexer 60. The controller 70 may include firmware 75. Firmware 75 comprises data, routines, and/or executable instructions stored in read-only memory or other hardware that controls operation of the image forming device 5 during a print cycle. A control panel 80, or other user interface, is coupled to the controller 70 by one or more conductors 83. The control panel 80 enables the user to input data and/or commands to the image forming device 5 to further control operation thereof during a print cycle.

Figure 2:
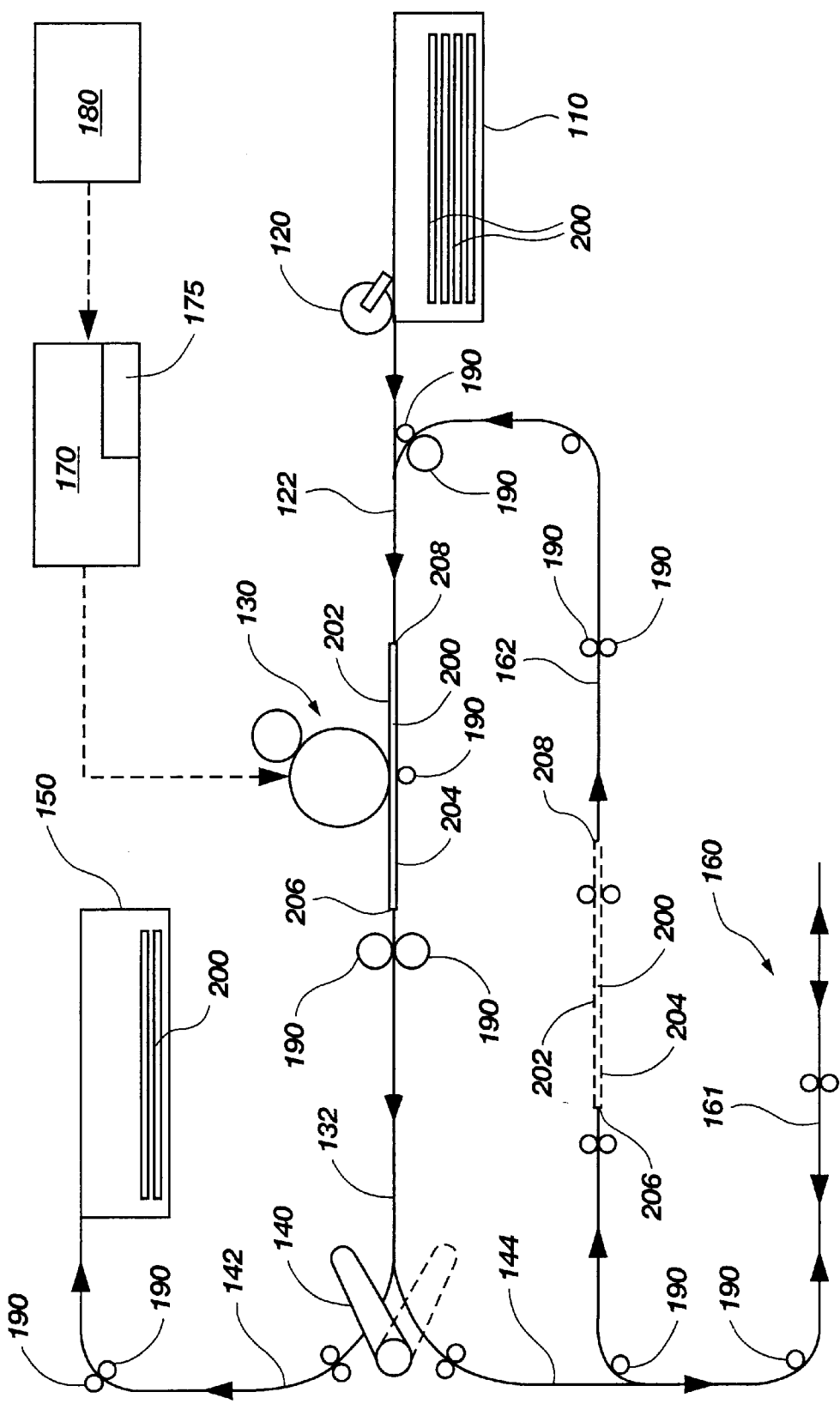
FIG. 2 is a schematic view of an exemplary embodiment of a conventional duplex printing device.

As an illustration of the configuration and operation of a typical image forming device, an exemplary embodiment of a conventional duplex printing device 105 is shown in FIG. 2. The duplex printing device 105 may comprise an ink jet printer, a laser printer, or any other similar printing device known in the art. Although only a duplex printing device 105 is shown and described herein, those of ordinary skill in the art will understand that the present invention is not so limited and, further, that the present invention is generally applicable to all types of image forming devices, whether color or monochrome, including photo copiers and facsimile devices.

The duplex printing device 105 includes a source device 110 having a source tray for storing a plurality of media sheets 200. A media sheet 200 may comprise a pre-cut sheet of paper, plastic (such as an overhead transparency), or vellum, as well as an envelope or cardstock. A pick roller 120 or other feed mechanism draws a media sheet 200 from the source device 110 and moves the media sheet 200 over a path 122 to a print engine 130, with the leading edge 206 of the media sheet 200 arriving first at print engine 130. The print engine 130, under direction of a controller 170, is configured to form images on one side 202 of the media sheet 200. The print engine 130 may comprise an ink jet type print engine or an electrophotographic type print engine (as is shown schematically in FIG. 2), both of which are well known in the art, or any other suitable printing device.

After images are formed on the first side 202 of the media sheet 200, the media sheet traverses over a path 132 to a path selection gate 140. If images are desired on only the first side 202 of the media sheet 200, the path selection gate 140 directs the media sheet 200 via a path 142 to an output device 150, which includes, in this instance, an output tray. For duplex printing, the path selection gate 140 directs the media sheet 200 over a path 144 to a duplexer 160. The duplexer 160 shown in FIG. 2 comprises a paper path 161 adapted to flip the media sheet 200 and to directly deliver the media sheet 200 back to the print engine 130 via path 162 to present an opposing, second side 204 of the media sheet 200 for application of images thereto. Upon entering and subsequently exiting the duplexer 160, the trailing edge 208 of the media sheet 200 becomes the leading edge thereof and will arrive at the print engine first with the second side 204 of the media sheet 200 being positioned for application of images thereto by print engine 130.

The duplexer 160 shown and described with respect to FIG. 2 is only exemplary, and those of ordinary skill in the art will appreciate that many types of duplexing systems are known in the art. By way of further example, and without limitation, other exemplary embodiments of image forming devices and duplexing systems are shown and described in U.S. Pat. No. 5,196,897 to Trask, U.S. Pat. No. 5,392,092 to Laidlaw et al., U.S. Pat. No. 5,772,343 to Beretta et al., U.S. Pat. No. 5,836,706 to Ruhe, U.S. Pat. No. 6,018,640 to Blackman et al., and U.S. Pat. No. 6,118,950 to Wibbels et al. Thus, the present invention is generally applicable to all image forming devices, irrespective of the particular duplexing system—as well as the particular print engine—utilized.

Operation of the duplex printing device 105—specifically the print engine 130, as well as the pick roller 120, path selection gate 140, and duplexer 160—is controlled by a controller 170, which may include firmware 175. Firmware 175 comprises data, routines, and/or executable instructions stored in read-only memory or other hardware that controls operation of the duplex printing device 105 during a print cycle. A control panel 180, or other user interface, coupled to the controller 170 enables the user to input data and/or commands to the duplex printing device 105 to further control operation thereof during a print cycle. Also, as will be understood by one of ordinary skill in the art, movement of the media sheet 200 between the components and subsystems of the duplex printing device 105 along the paths 122, 132, 142, 144, 161, 162 may be facilitated by a plurality of drive and/or metering rollers 190, which may be activated by one or more actuators (not shown). Movement of a media sheet 200 may be further facilitated by one or more guides or stops, or other similar mechanical devices.

While performing a duplex printing cycle, misalignment between a media sheet 200 and the print engine 130 of duplex printing device 105 may result in rotational skew, as well as translational skew. Such misalignment may result from a media sheet 200 that is misaligned in the source device 110, this misalignment not being corrected as the media sheet 200 is drawn out of the source device 110 and traverses the path 122 towards the print engine 130. Misalignment in the source device 110 may result from wear and tear of the source device 110 and/or from a source device 110 or component thereof that fails to meet design tolerance specifications. The rollers 190, guides, and actuators that move the media sheet 200 over the path 122 between the source tray 122 and print engine 130—as well as over the paths 132, 144, 161, and 162 as a media sheet 200 is routed through the duplexer 160 and back to the print engine 130—may be damaged or function improperly due to wear, manufacturing defects, and/or a failure to meet design tolerances. Thus, the various mechanical and electromechanical parts that comprise the duplex printing device 105 may, due to extended wear and/or manufacturing defects, also cause misalignment between the media sheet 200 and the print engine 130. As noted above, the condition of a media sheet 200 itself—i.e., moisture content, dimensional variations, etc.—may affect the manner in which the image forming device 105 is able to manipulate that media sheet 200. Further, even though the duplex printing device 105 may be producing duplex images on a media sheet 200 that meet performance specifications, it may still be desirable to compensate for rotational skewing in order to meet user demands for high performance applications.

Rotational skew occurring during the printing of duplex images, as noted above, can be eliminated or minimized according to methods and apparatus of the present invention. Specifically, referring now to FIGS. 3 and 4, rotational skew compensation can be achieved using a duplex test page 300 having skewing scale 305 from which a rotational skew correction factor 328 can be determined, as will be explained in greater detail below. The controller 70 of an image forming device 5, such as the controller 170 of the duplex printing device 105, is programmed to generate the duplex test page 300. The duplex test page 300 has a first side 302 and an opposing, second side 304. It will be appreciated by those of ordinary skill in the art that the labels "first" and "second" attached to the opposing sides 302, 304 of the duplex test page 300 are arbitrary, and either of the sides 302, 304 may be referred to as the "first" side and, further, the opposing sides 302, 304 of the duplex test page 304 may be referenced using other labels, such as simply the "front" and "back" sides.

Figure 3:
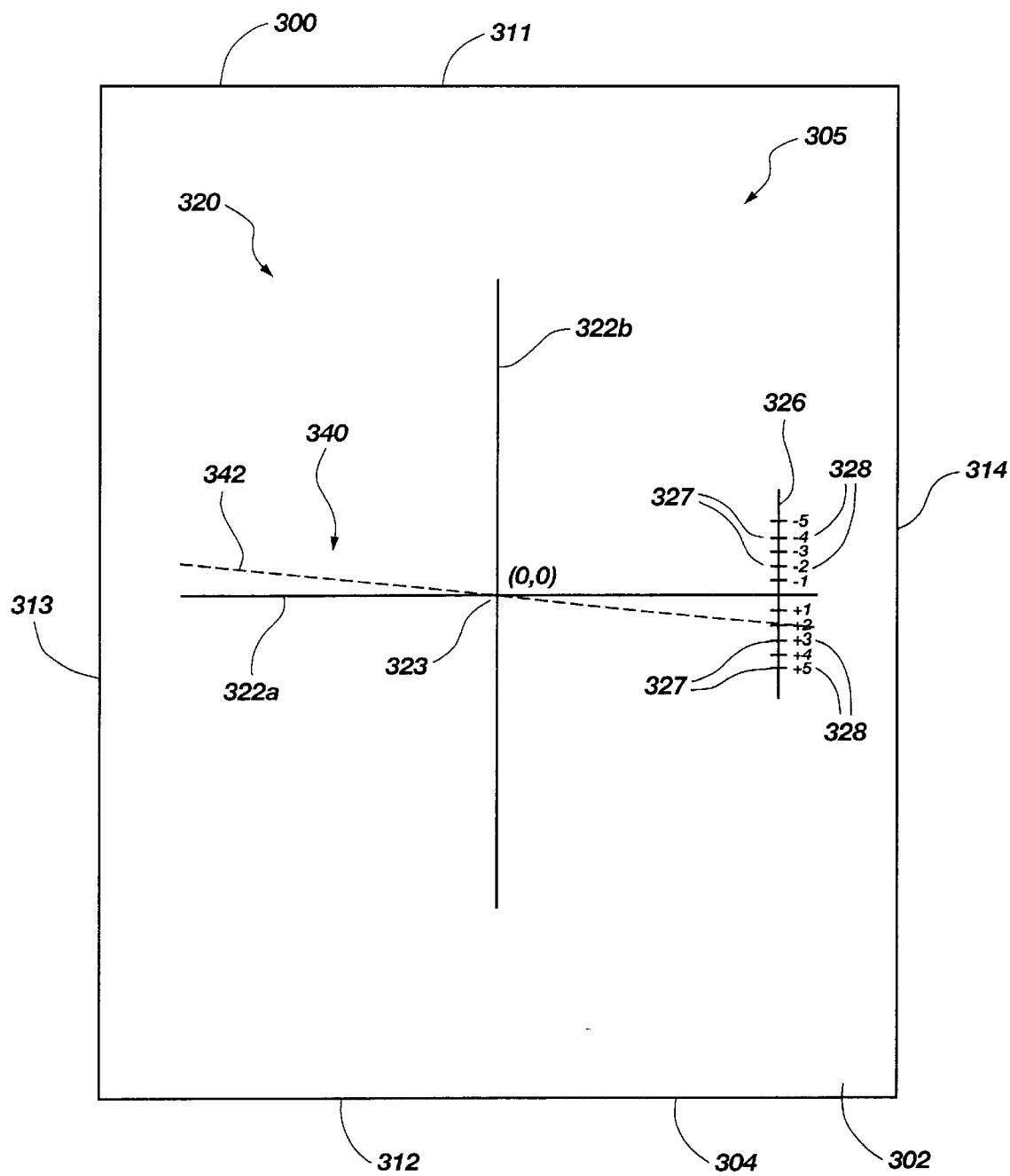
FIG. 3 shows a first side of a duplex test page according to an embodiment of the invention for determining a rotational skew correction factor.
Figure 4:
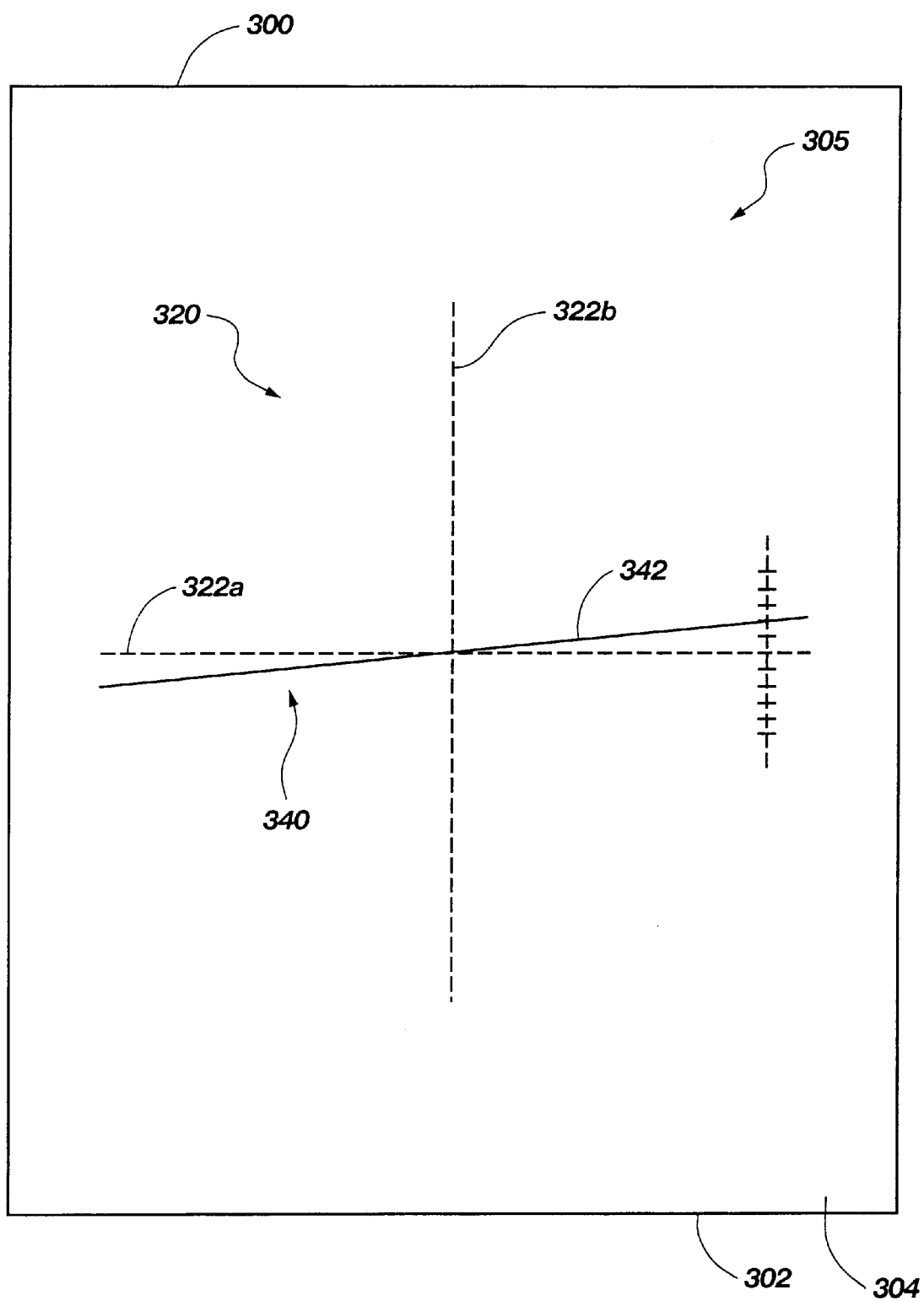
FIG. 4 shows an opposing, second side of the duplex test page of the embodiment of the present invention shown in FIG. 3.

The skewing scale 305 includes a first portion 320 formed on the first side 302 of the duplex test page 300 (see FIG. 3; shown in hidden line in FIG. 4) and a second portion 340 formed on the second side 304 thereof (see FIG. 4; shown in hidden line in FIG. 3). The first portion 320 includes mutually orthogonal coordinate axes 322a, 322b intersecting at an origin 323—i.e., an x-y coordinate system having an origin at (0,0)—and a skew axis 326 intersecting one of the coordinate axes 322a and oriented perpendicular thereto (and parallel to the other of the coordinate axes 322b). The skew axis 326 is located proximate one side 314 of the duplex test page 300; however, the skew axis may intersect the other of the coordinate axes 322b and be positioned near the top edge 311 or the bottom edge 312 of the duplex test page 300. One of the coordinate axes 322a is generally parallel to the mutually parallel edges 311, 312 of the duplex test page 300, and the other of the coordinate axes 322b is generally parallel to the mutually parallel edges 313, 314 of the duplex test page 300, the edges 311, 312 being generally perpendicular to the edges 313, 314. The skew axis 326 includes a plurality of tick marks 327 spaced along the length of the skew axis 326, each tick mark 327 corresponding to a rotational skew correction factor 328, which may be printed next to their respective tick mark 327. Although depicted in FIG. 3 as being equally spaced along the skew axis 326, the tick marks 327 may not necessarily be equidistantly spaced therealong.

The second portion 340 of skewing scale 305 comprises a skew line 342, which, again, is formed on the second side 304 of the duplex test page 300. The skew line 342 is a substantially straight line that intersects the origin 323 of the coordinate axes 322a, 322b formed on the first side 302 of the duplex test page 300. To insure the skew line 342 intersects the origin 323 of coordinate axes 322a, 322b, it may be desirable to perform duplex registration—such as described in U.S. Pat. No. 6,118,950, as noted above—prior to correcting for rotational skew according to the methods of the instant invention. Further, the skew line 342 is hypothetically parallel to one of the coordinate axes 322*a* (and perpendicular to the other of the coordinate axes 322*b*). However, if misalignment exists between the duplex test page 300 and the print engine 30 of an image forming device 5, the skew line 342 will be rotationally skewed relative to images formed on the first side 302 of the duplex test page 300.

The first portion 320 of the skewing scale 305 in cooperation with the second portion 340 of the skewing scale 305 provide a tool for eliminating or at least partially removing any rotational skew inherent in an image forming device 5 or resulting from the condition of a media sheet. To compensate for the rotational skew, a duplex test page 300 according to the invention is printed. The first portion 320 of the skewing scale 305 is compared against the second portion 340 thereof, which may be facilitated by holding the duplex test page 300 up to a light source, and a rotational skew correction factor 328 is determined. Specifically, the skew line 342 is compared to the coordinate axes 322*a*, 322*b* and skew axis 326, and the tick mark 327 most closely spaced to the point of intersection between the skew line 342 and the skew axis 326 corresponds to the required rotational skew correction factor 328, which may be directly read from the duplex test page 300.

The operator can then input the rotational skew correction factor 328 into the controller 70, 170 of the image forming device 5, 105 via the control panel 80, 180. The controller 70, 170 is configured to accept the rotational skew correction factor 328 and to direct the print engine 30, 130 of the image forming device 5, 105 to alter placement of images on the first and/or second side of a media sheet based upon the rotational skew correction factor 328. Thus, during operation of an image forming device 5, 105, images formed on the opposing sides of a media sheet during duplex printing will be substantially rotationally aligned. Rotational skew correction factors 328 may also be provided to the controller 70, 170 of an image forming device 5, 105 to orient the images formed on the opposing sides of a media sheet relative to the edges of the media sheet itself (i.e., by comparing the coordinate axes 322*a*, 322*b* against the mutually parallel edges 311, 312, 313, 314, respectively).

In addition to the methods of the present invention described above, an image forming device configured to perform these methods also falls within the scope of the present invention. The data, routines, and/or executable instructions enabling the printing of a duplex test page 300 and enabling the controller 70, 170 of an image forming device 5, 105 to receive and respond to an inputted rotational skew correction factor 328 may be included in the firmware 75, 175 of the controller 70, 170. Alternatively, as will be apparent to one of ordinary skill in the art, such data and executable instructions may be implemented using software or by designing them into hardware components of the controller 70, 170.

Typically, the controller 70, 170 of an image forming device 5, 105 will respond to the rotational skew correction factor 328 by directing the print engine 30, 130 to alter placement and/or orientation of images on one of the sides of a media sheet, such that rotational skew is substantially eliminated. Such a response can be implemented by hardware, such as an application specific integrated circuit, or software—e.g., the controller 70, 170 may be programmed to receive a rotational skew correction factor 328 and to generate an image with the correct rotational orientation that is to be applied to a media sheet. Generating an image having a desired rotational orientation may be accomplished using a coordinate transformation matrix ("CTM").

A CTM is generally a three-by-three matrix, wherein the entries in the matrix relate a modified or transformed coordinate system to an initial or baseline coordinate system.

The images formed on the first side of a media sheet are generated in relation to a baseline coordinate system for that side, and the images formed on the second side of the media sheet are generated in relation to a baseline coordinate system for the media sheet second side. The baseline coordinate system of the media sheet first side is defined by an initial first side CTM, and the baseline coordinate system of the media sheet second side is defined by an initial second side CTM. If there is no rotational skew, the baseline coordinate system of the media sheet first side will substantially coincide with the baseline coordinate system of the media sheet second side, and the first side CTM and the second side CTM may each initially comprise an identity matrix (i.e., one having the numbers one across its diagonal and zeros at all other entries).

If rotational skew is present, however, the baseline coordinate system of, for example, the media sheet second side will not be coincident with the baseline coordinate system of the media sheet first side. To compensate for this rotational skew, the entries in the second side CTM are modified in response to a rotational skew correction factor 328, such that the baseline coordinate system of the media sheet second side is transformed to a new coordinate system that is substantially coincident with the baseline coordinate system of the media sheet first side. In this embodiment, the controller 70, 170 and/or firmware 75, 175 of an image forming device 5, 105 is programmed to receive a rotational skew correction factor 328 and to modify the second side CTM to make the necessary coordinate transformation. Thus, images formed on the media sheet second side will be generated with respect to the transformed coordinate system—which, as noted above, is now coincident with the baseline coordinate system of the media sheet first side—using the modified CTM, and the rotational skew is substantially eliminated. Those of ordinary skill in the art will understand that rotational skew compensation may be achieved by modifying both the first side CTM and the second side CTM.

It is also within the scope of the present invention to compensate for rotational skew by purely mechanical adjustments, or by a combination of software and mechanical adjustments. For example, in response to a rotational skew correction factor, the controller 70, 170 may direct the physical movement of a roller, guide, or other mechanical device of an image forming device 5, 105 to facilitate alignment of a media sheet relative to the print engine 30, 130 of the image forming device 5, 105.

Also, it should be noted that the selection of a set of rotational skew correction factors 328 is arbitrary, the only requirement being that the controller 70, 170 of an image forming device 5, 105 be capable of interpreting an inputted rotational skew correction factor 328 and performing the necessary adjustments. By way of example, the rotational skew correction factors 328 shown in FIG. 3 (i.e., −5, −4, −3, −1, +1, +2, +3, +4, +5) may be replaced with −F, −D, −C, −B, −A, +A, +B, +C, +D, +E, or by some other suitable set of correction factors. Further, a rotational skew correction factor 328 does not necessarily have to correspond to any physical parameter, such as a measured angle, so long as the controller 70, 170 is able to receive and respond to the rotational skew correction factor 328. As shown in FIG. 3, for example, the locations of the tick marks 327—i.e., the distances between consecutive tick marks 327—on the skew axis 326 do not correspond to a standard unit angle as measured about the origin 323 of the coordinate axes 322*a*, 322*b*.

Figure 5:
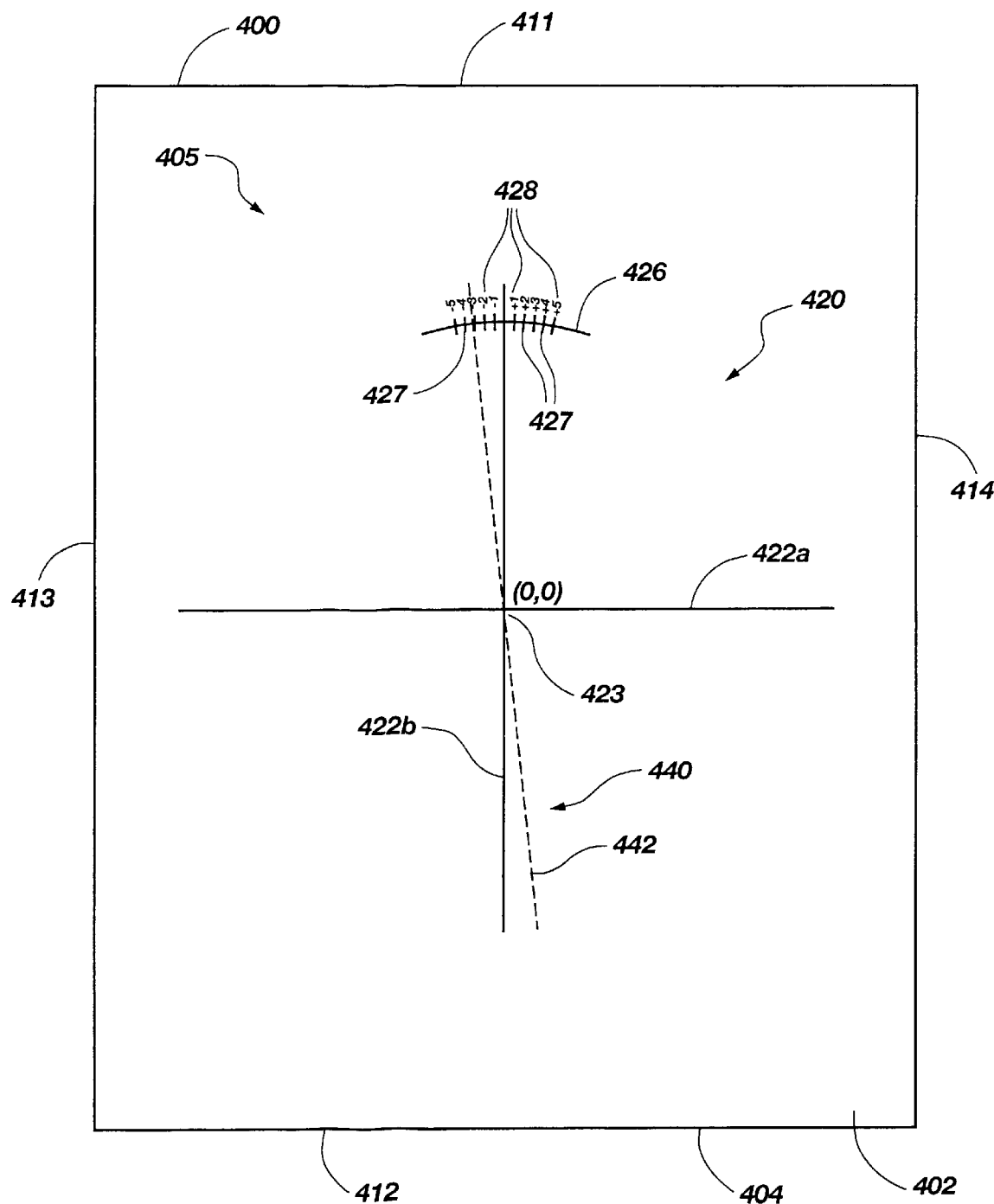
FIG. 5 shows a first side of a duplex test page according to another embodiment of the invention for determining a rotational skew correction factor.
Figure 6:
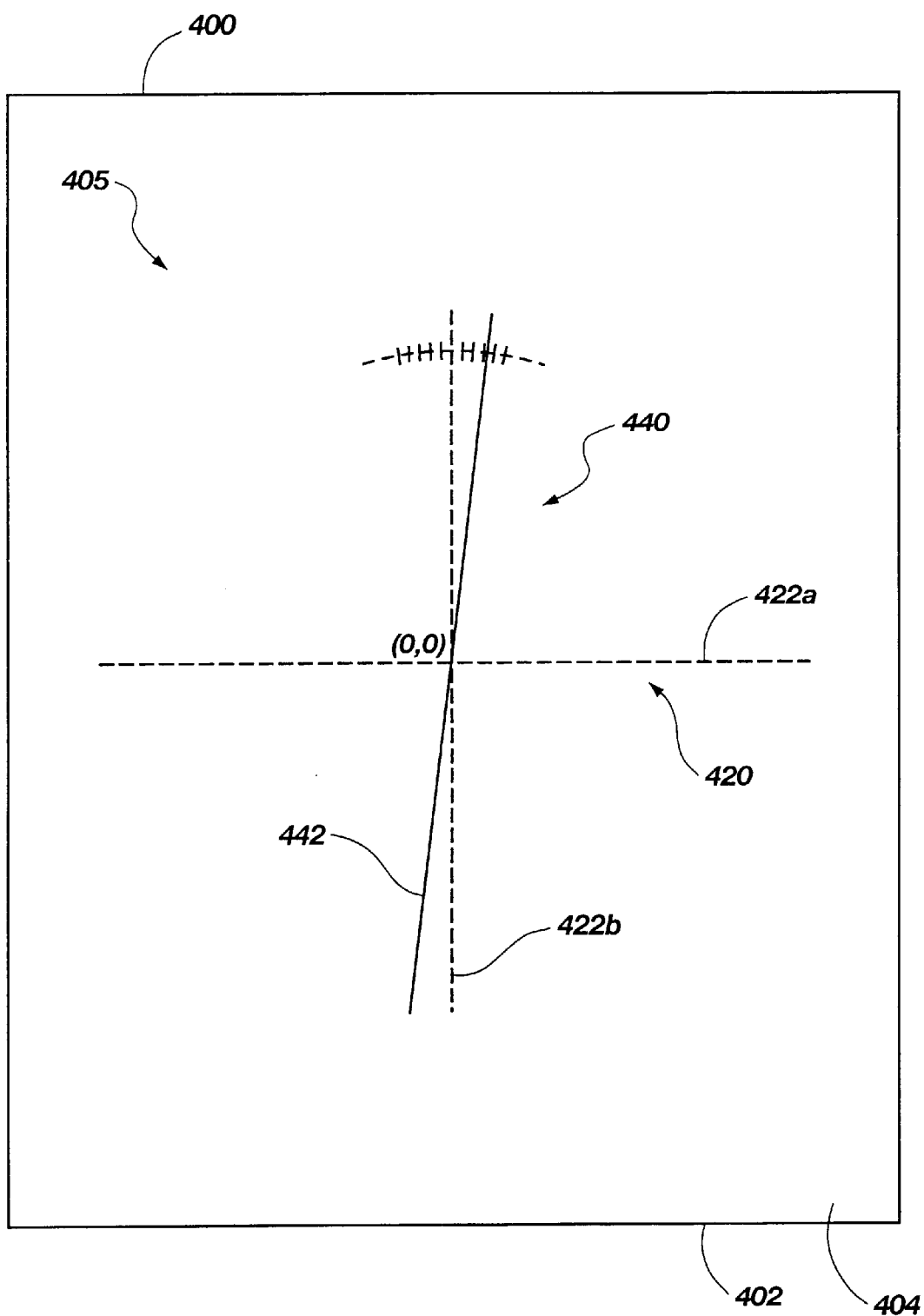
FIG. 6 shows an opposing, second side of the duplex test page of the embodiment of the present invention shown in FIG. 5.

Referring to FIGS. 5 and 6, an alternative embodiment of a duplex test page 400 according to the present invention is shown. The duplex test page 400 includes a skewing scale 405 from which a rotational skew correction factor 428 can be determined. The controller 70, 170 of an image forming device 5, 105 is programmed to generate the duplex test page 400, as was noted above for the duplex test page 300. The duplex test page 400 includes a first side 402 and an opposing, second side 404, which are, once again, arbitrarily assigned labels.

The skewing scale 405 includes a first portion 420 formed on the first side 402 of the duplex test page 400 (see FIG. 5; shown in hidden line in FIG. 6) and a second portion 440 formed on the second side 404 thereof (see FIG. 6; shown in hidden line in FIG. 5). The first portion 420 includes mutually orthogonal coordinate axes 422a, 422b intersecting at an origin 423 and a skew axis 426 intersecting one of the coordinate axes 422b. As shown in FIG. 5, the skew axis 426 is positioned near the top edge 411 of the duplex test page 400. One of the coordinate axes 422a is generally parallel to the mutually parallel edges 411, 412 of the duplex test page 400, and the other of the coordinate axes 422b is generally parallel to the mutually parallel edges 413, 414 of the duplex test page 400, the edges 411, 412 being generally perpendicular to the edges 413, 414.

The skew axis 426 includes a plurality of tick marks 427 spaced along the length of the skew axis 426, each tick mark 427 corresponding to a rotational skew correction factor 428, which may be printed next to their respective tick mark 427. In this embodiment, as shown in FIG. 5, the distance between any two adjacent tick marks 427 corresponds to a standard unit angle as measured about the origin 423 of the coordinate axes 422a, 422b. The standard unit angle may be any value, such as a half degree (0.5°), one degree (1.0°), two degrees (2.0°)—as shown in FIG. 5—or any other suitable unit of measurement. It should be noted, however, that the rotational skew depicted in FIGS. 5 and 6 (as well as that depicted in FIGS. 3 and 4) has been exaggerated for clarity and that, in practice, the rotational skew inherent in an image forming device 5, 105 will generally be relatively small. Therefore, the standard unit angle between adjacent tick marks 427 (or the distance between tick marks generally) must be sufficiently small to provide a resolution enabling precise adjustment of rotational skew.

The second portion 440 of skewing scale 405 comprises a skew line 442, which, again, is formed on the second side 404 of the duplex test page 400. The skew line 442 is a substantially straight line that intersects the origin 423 of the coordinate axes 422a, 422b formed on the first side 402 of the duplex test page 400. To insure the skew line 442 intersects the origin 423 of coordinate axes 422a, 422b, it may be desirable to perform duplex registration prior to correcting for rotational skew according to the methods of the instant invention. Further, the skew line 442 is hypothetically parallel to one of the coordinate axes 422b (and perpendicular to the other of the coordinate axes 422a). However, if misalignment exists between the duplex test page 400 and the print engine 30, 130 of an image forming device 5, 105, the skew line 442 will be rotationally skewed relative to images formed on the first side 402 of the duplex test page 400.

The first portion 420 of the skewing scale 405 in cooperation with the second portion 440 of the skewing scale 405 provide a tool for eliminating or at least partially removing any rotational skew inherent in an image forming device 5, 105 or resulting from the condition of a media sheet. To compensate for the rotational skew, a duplex test page 400 is printed. The first portion 420 of the skewing scale 405 is compared against the second portion 440 thereof, which may be facilitated by holding the duplex test page 400 up to a light source, and a rotational skew correction factor 428 determined. Specifically, the skew line 442 is compared to the coordinate axes 422a, 422b and skew axis 426, and the tick mark 427 most closely spaced to the point of intersection between the skew line 442 and the skew axis 426 corresponds to the required rotational skew correction factor 428, which may be directly read from the duplex test page 400.

As noted above, the operator can then input the rotational skew correction factor 428 into the controller 70, 170 of the image forming device 5, 105 via a control panel 80, 180. The controller 70, 170 is configured to accept the rotational skew correction factor 428 and to direct the print engine 30, 130 of the image forming device 5, 105 to alter placement of images on the second side of a media sheet based upon the rotational skew correction factor, such as may be accomplished using coordinate transformation matrices, as noted above. Accordingly, during operation of an image forming device 5, 105, images formed on the opposing sides of a media sheet during duplex printing will be substantially rotationally aligned. Rotational skew correction factors 428 may also be provided to the controller 70, 170 of an image forming device 5, 105 to orient the images formed on the opposing sides of a media sheet relative to the edges of the media sheet itself (i.e., by comparing the coordinate axes 422a, 422b against the mutually parallel edges 411, 412, 413, 414, respectively).

In a further alternative embodiment of the invention, the controller 70, 170 of an image forming device 5, 105 is configured to receive and store separate rotational skew correction factors for each one of a plurality of source trays included in a source device 10, 110 of the image forming device 5, 105. Conventional image forming devices 5, 105 typically include source devices 10, 110 having multiple source trays for holding differing sizes, colors, and types of media sheets. As noted above, a media sheet may be misaligned when drawn out of a source device 10, 110 due to wear and/or defects in one or more components, such as the source trays, of the source device 10, 110, or a media sheet may become misaligned while traversing the paper path 22, 122 toward the print engine 30, 130. Thus, where a source device 10, 110 of an image forming device 5, 105 includes a plurality of source trays, each source tray may impart a specific and unique magnitude of rotational misalignment to media sheets drawn out of that source tray. Accordingly, to correct for rotational skew, it may be desirable to identify a unique rotational skew correction factor 328, 428 for each of the plurality of source trays included in a source device 10, 110 of an image forming device 5, 105.

For this embodiment of the invention, the controller 70, 170 of an image forming device 5, 105 is configured to receive and store a unique rotational skew correction factor 328, 428 for each source tray included in the source device 10, 110 thereof. Compensating for rotational skew proceeds as described above; however, a separate duplex test page 300, 400 is printed for each source tray of the source device 10, 110. The duplex test page 300, 400 printed from a source tray is used to determine the rotational skew correction factor 328, 428 for that source tray, and this rotational skew correction factor 328, 428 is then entered into the controller 70, 170 via control panel 80, 180. The controller 70, 170 and/or firmware 75, 175 may be programmed with a distinct set of coordinate transformation matrices for each source tray of the source device 10, 110 of an image forming device 5, 105.

Figure 7:
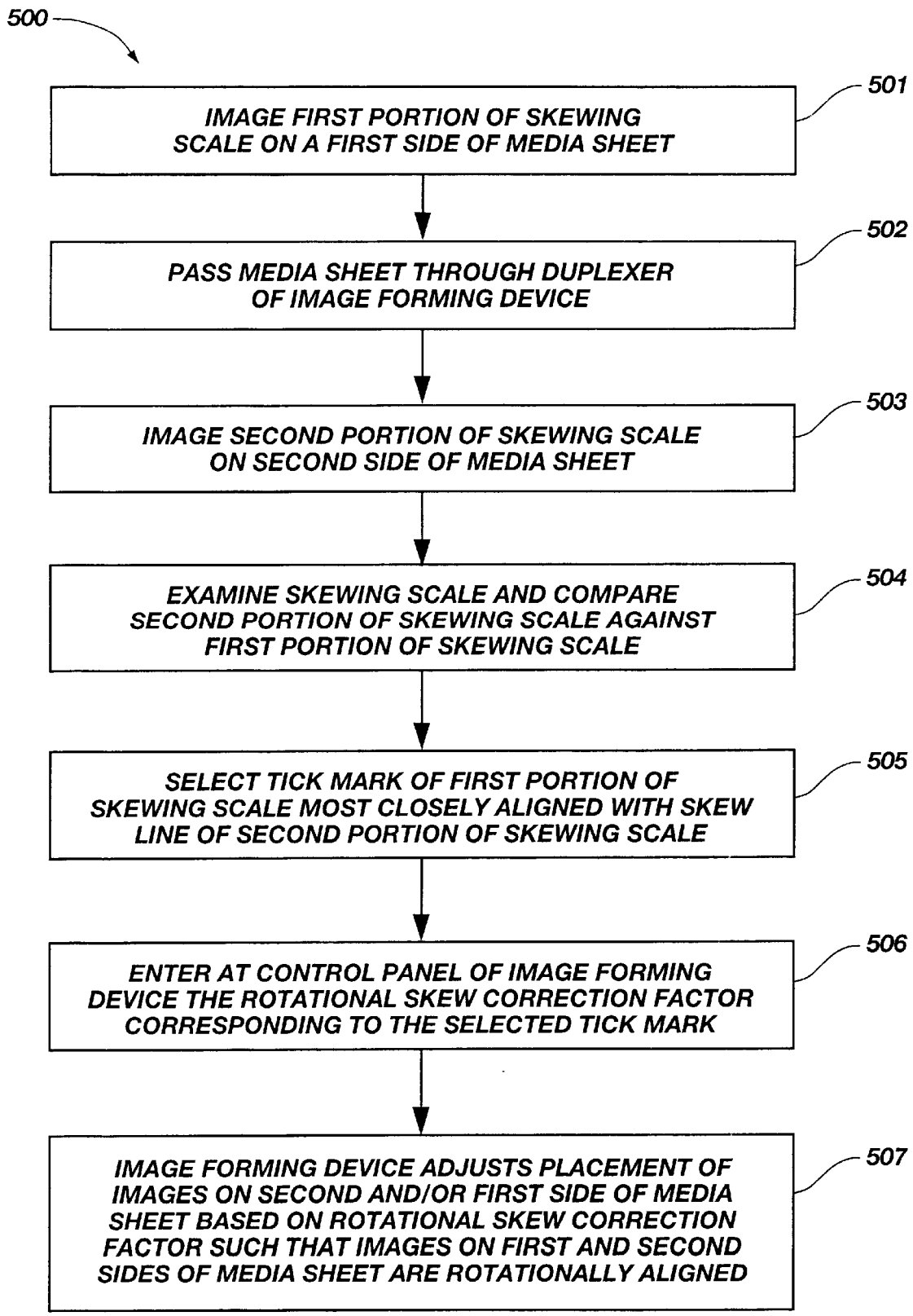
FIG. 7 is a flow chart depicting a method according to one embodiment of the present invention.

Exemplary embodiments of a duplex test page 300, 400 having been described, the methods of the present invention may be better understood by reference to FIG. 7, which contains a flow chart summarizing an exemplary method 500 of compensating for rotational skew in an image forming device according to the invention. The first step 501 comprises the act of imaging a first portion of a skewing scale on a first side of a media sheet using the image forming device. In the second step 502, the media sheet is passed through the duplexer of the image forming device. Imaging a second portion of the skewing scale on an opposing, second side of the media sheet comprises the third step 503. The fourth step 504 comprises examining the skewing scale by comparing the second portion of the skewing scale against the first portion thereof. Again, this step may be facilitated by holding the media sheet up to a light source. In step five 505, a tick mark of the first portion of the skewing scale is selected that is most closely aligned with a skew line of the second portion. Step six 506 comprises entering into the image forming device a rotational skew correction factor corresponding to the tick mark selected in step five 505. In response, according to step seven 507, the image forming device adjusts placement of images on the second and/or first side of the media sheet based on the rotational skew correction factor such that images formed on the opposing sides of the media sheet are rotationally aligned. The above-described method may be repeated until a desired rotational alignment is achieved. Further, as noted above, the above-described method may be repeated for each source tray of an image forming device having two or more source trays.

Methods and apparatus according to the present invention having been herein described, those of ordinary skill in the art will appreciate the many advantages of the present invention. The present invention provides a simple and inexpensive method for compensating for rotational skew when printing duplex images. The invention is applicable to duplex printing on any type of image forming device known in the art, including ink jet printers, laser printers, photo copiers, and facsimile devices. The methods according to the invention may be implemented through software using minor changes and/or additions to the controller and/or firmware of conventional image forming devices. These methods enable an operator to quickly and easily determine a rotational skew correction factor from a duplex test page, which can then be entered into the controller of an image forming device. In response, the controller direct the print engine of the image forming device to adjust placement of images on a media sheet, a result that is transparent to the operator and requires nothing more than selecting the appropriate correction factor and entering the same at the control panel of the image forming device.

The foregoing detailed description and accompanying drawings are only illustrative and not restrictive. They have been provided primarily for a clear and comprehensive understanding of the present invention and no unnecessary limitations are to be understood therefrom. Numerous additions, deletions, and modifications to the embodiments described herein, as well as alternative arrangements, may be devised by those skilled in the art without departing from the spirit of the present invention and the scope of the appended claims.

What is claimed is:

1. A method of at least partially compensating for rotational skew while printing duplex images with an image forming device, comprising:

imaging a first portion of a skewing scale on one side of a media sheet, said first portion including mutually orthogonal coordinate axes intersecting at an origin, a skew axis intersecting one of said mutually orthogonal coordinate axes, and oriented substantially perpendicular thereto; and a plurality of tick marks spaced along said skew axis;

imaging a second portion of said skewing scale on an opposing side of said media sheet;

comparing said second portion of said skewing scale against said first portion of said skewing scale to observe rotational skew between said first and second portions;

selecting a rotational skew correction factor based upon said observed rotational skew; and providing said rotational skew correction factor to a controller of said image forming device.

2. The method of claim 1, further comprising:

providing another media sheet to said image forming device, said another media sheet to have first images formed on a first side thereof and second images formed on an opposing second side thereof; and altering a rotational orientation of at least one of said first and second images in response to said rotational skew correction factor.

3. The method of claim 2, wherein said act of altering a rotational orientation of at least one of said first and second images comprises modifying a coordinate transformation matrix associated with one of said first and second sides of said media sheet in response to said rotational skew correction factor.

4. A method of at least partially compensating for rotational skew while printing duplex images with an image forming device, comprising:

imaging mutually orthogonal coordinate axes on one side of a media sheet, said mutually orthogonal coordinate axes intersecting at an origin;

imaging a skew axis on said one side of said media sheet, said skew axis intersecting one axis of said mutually orthogonal coordinate axes and oriented perpendicular thereto, said skew axis including a plurality of tick marks spaced therealong;

imaging a substantially straight skew line on an opposing side of said media sheet, said skew line intersecting said origin of said mutually orthogonal coordinate axes;

comparing said skew line against said mutually orthogonal axes and said skew axis to observe a point of intersection of said skew line with said skew axis;

determining which tick mark of said plurality of tick marks is most closely located to said point of intersection and selecting a rotational skew correction factor corresponding to said most closely located tick mark; and providing said rotational skew correction factor to a controller of said image forming device.

5. The method of claim 4, further comprising:

providing another media sheet to said image forming device, said another media sheet to have first images formed on a first side thereof and second images formed on an opposing second side thereof; and altering a rotational orientation of at least one of said first and second images in response to said rotational skew correction factor.

6. The method of claim 5, wherein said act of altering a rotational orientation of at least one of said first and second images comprises modifying a coordinate transformation matrix associated with one of said first and second sides of said media sheet in response to said rotational skew correction factor.

7. A test page for use in correcting rotational skew while printing duplex images with an image forming device, comprising:
   a first portion of a skewing scale formed on one side of a media sheet, said first portion comprising mutually orthogonal coordinate axes intersecting at an origin;
   a skew axis intersecting one of said mutually orthogonal coordinate axes and oriented substantially perpendicular thereto; and
   a plurality of tick marks spaced along said skew axis; and
   a second portion of said skewing scale formed on an opposing side of said media sheet, said second portion configured for comparison against said first portion to observe rotational skew.

8. The test page of claim 7, said first portion further comprising a plurality of rotational skew correction factors, one rotational skew correction factor of said plurality of rotational skew correction factors corresponding to each tick mark of said plurality of tick marks.

9. The test page of claim 7, wherein said plurality of tick marks are equidistantly spaced along said skew axis.

10. The test page of claim 7, wherein distances between any two adjacent tick marks of said plurality of tick marks correspond to a standard unit of measurement.

11. The test page of claim 10, wherein said standard unit of measurement comprises a standard unit angle as measured about said origin of said mutually orthogonal axes.

12. The test page of claim 7, said second portion comprising a substantially straight skew line intersecting said origin of said mutually orthogonal axes, said skew line configured for comparison against said mutually orthogonal axes and said skew axis to observe said rotational skew.

13. The test page of claim 12, said first portion further comprising a rotational skew correction factor corresponding to a tick mark of said plurality of tick marks most closely spaced from a point of intersection of said skew line with said skew axis.

14. An image forming device, comprising:
   a source device configured for receiving a plurality of media sheets;
   a print engine configured to form images on one side of a media sheet received from said source tray;
   an output device configured for receiving media sheets having images formed thereon from said print engine;
   a duplexer configured for receiving a media sheet having images on one side thereof from said print engine and for presenting an opposing side of said media sheet to said print engine for printing;
   a path selection gate configured to direct a media sheet to said output device or to direct said media sheet to said duplexer; and
   a controller configured to print a test page, said test page comprising a first portion of a skewing scale formed on one side of said test page, said first portion comprising mutually orthogonal coordinate axes intersecting at an origin, a skew axis intersecting one of said mutually orthogonal coordinate axes and oriented substantially perpendicular thereto, and a plurality of tick marks spaced along said skew axis and a second portion of said skewing scale formed on an opposing side of said test page, said second portion configured for comparison against said first portion to determine a rotational skew correction factor indicative of a rotational skew between said first and second portions, said controller further configured to receive said rotational skew correction factor and to at least partially correct said rotational skew in response to said rotational skew correction factor.

15. The image forming device of claim 14, wherein said source device comprises one or more source trays configured for receiving a plurality of media sheets, and said controller is configured to receive and store at least one rotational skew correction factor indicative of a rotational skew associated with each of said one or more source trays.

16. An image forming device, comprising:
   a print engine configured to form first images on a side of a media sheet presented to said print engine and to form second images on an opposing side of said media sheet presented to said print engine;
   a controller configured to receive a rotational skew correction factor indicative of a rotational skew between said first and second images, said rotational skew correction factor formed from a skewing scale used for said first and second images, said skewing scale including mutually orthogonal coordinate axes intersecting at an origin and a skew axis intersecting one of the coordinate axes and oriented perpendicular thereto, said controller further configured to direct said print engine to alter positioning of one of said first and second images in response to said rotational skew correction factor to at least partially remove said rotational skew.

17. The image forming device of claim 16, said controller further configured for printing a test page, said test page comprising:
   a first portion of a skewing scale formed on one side of said test page; and
   a second portion of said skewing scale formed on an opposing side of said test page, said second portion configured for comparison against said first portion to determine said rotational skew correction factor.

18. The image forming device of claim 17, said first portion comprising:
   mutually orthogonal coordinate axes intersecting at an origin formed on one side of said test page;
   a skew axis formed on said one side of said test page and intersecting one of said mutually orthogonal coordinate axes and oriented substantially perpendicular thereto;
   a plurality of tick marks spaced along said skew axis formed on said one side of said test page; and
   plurality of rotational skew correction factors formed on said one side of said test page, one rotational skew correction factor of said plurality of rotational skew correction factors corresponding to each tick mark of said plurality of tick marks.

19. The image forming device of claim 18, said second portion comprising a substantially straight skew line formed on an opposing side of said test page, said skew line intersecting said origin of said mutually orthogonal axes and configured for comparison against said mutually orthogonal axes and said skew axis to observe said rotational skew.

20. An image forming device, comprising:
   a print engine configured to form first images on a first side of a media sheet presented to said print engine and to form second images on an opposing second side of said media sheet presented to said print engine;
   a set of executable instructions stored in memory of a controller, said set of executable instructions enabling said controller to receive a rotational skew correction factor indicative of a rotational skew between said first and second images, said set of executable instructions further enabling said controller to direct said print engine to alter positioning of one of said first and second images in response to said rotational skew correction factor to at least partially remove said rotational skew, said rotational skew correction factor formed from a skewing scale used for said first and second images, said skewing scale including mutually orthogonal coordinate axes intersecting at an origin and a skew axis intersecting one of the coordinate axes and oriented perpendicular thereto.

21. The image forming device of claim 20, said set of executable instruction further enabling said controller to print a test page, said test page comprising:

a first portion of a skewing scale formed on one side of said test page; and a second portion of said skewing scale formed on an opposing side of said test page, said second portion configured for comparison against said first portion to determine said rotational skew correction factor.

22. The image forming device of claim 20, said set of executable instructions including at least one coordinate transformation matrix associated with one of said first and second sides of said media sheet, said executable instructions further configured to modify said at least one coordinate transformation matrix in response to said rotational skew correction factor.

* * * * *